US010196054B2

(12) United States Patent
Colavincenzo et al.

(10) Patent No.: US 10,196,054 B2
(45) Date of Patent: Feb. 5, 2019

(54) DRIVER BREAK PREPARATION SYSTEM FOR A HYBRID VEHICLE

(71) Applicant: Bendix Commercial Vehicle Systems LLC, Elyria, OH (US)

(72) Inventors: David D. Colavincenzo, Castalia, OH (US); Fernando Venegas Diaz, Elyria, OH (US)

(73) Assignee: Bendix Commercial Vehicle Systems LLC, Elyria, OH (US)

(*) Notice: Subject to any disclaimer, the term of this patent is extended or adjusted under 35 U.S.C. 154(b) by 30 days.

(21) Appl. No.: 15/379,383

(22) Filed: Dec. 14, 2016

(65) Prior Publication Data

US 2018/0162356 A1    Jun. 14, 2018

(51) Int. Cl.
*B60W 20/13* (2016.01)
*B60L 11/18* (2006.01)
*B60L 11/14* (2006.01)

(52) U.S. Cl.
CPC ............ *B60W 20/13* (2016.01); *B60L 11/14* (2013.01); *B60L 11/1862* (2013.01); *B60L 2240/42* (2013.01); *B60L 2240/44* (2013.01); *B60L 2240/54* (2013.01); *B60L 2250/16* (2013.01); *B60W 2510/244* (2013.01); *B60W 2710/06* (2013.01); *B60W 2710/08* (2013.01); *B60Y 2300/91* (2013.01); *B60Y 2400/112* (2013.01); *B60Y 2400/92* (2013.01); *Y10S 903/93* (2013.01)

(58) Field of Classification Search
CPC ............ B60W 20/13; B60W 2710/06; B60W 2710/08; B60W 2510/244; B60L 11/1862; B60L 11/14; B60L 2240/42; B60L 2240/44; B60L 2250/16; B60L 2240/54; Y10S 903/93; B60Y 2400/112; B60Y 2400/92; B60Y 2300/91
See application file for complete search history.

(56) References Cited

U.S. PATENT DOCUMENTS

| 5,349,535 | A | 9/1994 | Gupta |
| 6,314,347 | B1 | 11/2001 | Kuroda et al. |
| 6,344,732 | B2 | 2/2002 | Suzuki |
| 6,636,787 | B2 | 10/2003 | Yamaguchi et al. |
| 7,552,705 | B2 | 6/2009 | Serkh et al. |

(Continued)

OTHER PUBLICATIONS

Yano et al., "Estimation of EV Power Consumption and Route Planning Using Probe Data", SEI Technical Review, No. 78, Apr. 2014, pp. 29-34.

(Continued)

*Primary Examiner* — Rodney A Butler
(74) *Attorney, Agent, or Firm* — Crowell & Moring LLP

(57) ABSTRACT

A hybrid electric vehicle control system and process initiates active charging and power rationing control strategies in accordance with determining that a predicted state of charge of an electrical energy storage unit during an anticipated period of non-driving will be below an anticipated energy consumption during the anticipated period of non-driving. The determination is made, and the active charging and rationing are initiated, in advance of the period of non-driving in order to ensure that a state of charge of the electrical energy storage unit is sufficient to supply the anticipated energy consumption during the period of non-driving.

18 Claims, 4 Drawing Sheets

(56) References Cited

U.S. PATENT DOCUMENTS

| | | |
|---|---|---|
| 7,958,958 B2 | 6/2011 | De la Torre Bueno |
| 8,022,674 B2 | 9/2011 | Miura |
| 8,090,515 B2 | 1/2012 | Jeon et al. |
| 8,340,849 B2 | 12/2012 | Amano et al. |
| 8,417,403 B2 | 4/2013 | Iida et al. |
| 8,548,660 B2 | 10/2013 | Thai-Tang et al. |
| 8,634,939 B2 | 1/2014 | Martin et al. |
| 8,825,242 B2 | 9/2014 | Foster |
| 8,874,293 B2 | 10/2014 | Gilman et al. |
| 8,874,344 B2 | 10/2014 | Aldighieri et al. |
| 8,914,173 B2 | 12/2014 | Biondo et al. |
| 8,937,452 B2 | 1/2015 | Schwarz et al. |
| 9,014,900 B2 | 4/2015 | Hokoi et al. |
| 9,039,568 B2 | 5/2015 | Banker et al. |
| 9,043,060 B2 | 5/2015 | Sujan et al. |
| 9,067,591 B2 | 6/2015 | Tan et al. |
| 9,114,806 B2 | 8/2015 | Wang et al. |
| 9,266,529 B2 | 2/2016 | Dufford |
| 9,371,074 B1* | 6/2016 | Luehrsen ............ B60W 50/02 |
| 9,457,682 B2 | 10/2016 | Twarog et al. |
| 9,457,792 B2 | 10/2016 | Bradley et al. |
| 2003/0092525 A1* | 5/2003 | Gu ................ B60K 6/442 |
| | | 475/5 |
| 2008/0027639 A1 | 1/2008 | Tryon |
| 2009/0107743 A1 | 4/2009 | Alston et al. |
| 2010/0235030 A1* | 9/2010 | Xue ................ B60L 1/02 |
| | | 701/22 |
| 2011/0246013 A1* | 10/2011 | Yee ................ B60L 11/1859 |
| | | 701/22 |
| 2013/0093393 A1 | 4/2013 | Shimotani et al. |
| 2014/0136034 A1* | 5/2014 | Tolkacz ................ B60W 20/00 |
| | | 701/22 |
| 2014/0371983 A1 | 12/2014 | Miyashita et al. |
| 2015/0097512 A1 | 4/2015 | Li et al. |
| 2015/0217652 A1* | 8/2015 | Chupin ................ B60W 50/14 |
| | | 320/137 |
| 2016/0076899 A1 | 3/2016 | Macneille et al. |
| 2016/0114685 A1* | 4/2016 | Hudson ................ B60L 11/02 |
| | | 307/10.1 |
| 2016/0243947 A1 | 8/2016 | Perkins et al. |

OTHER PUBLICATIONS

Anonymous, "Semi Truck Regenerative braking/Electric motor on transaxle could save a lot of fuel 24 hrs per day . . . ", Tesla Forums at website https://forums.tesla.com/forum/forums/semi-truck-regenerative-brakingelectric-motor-transaxle-could-save-lot-fuel-24-hrs-day, Jun. 15, 2013 , 5 total pages.

Anonymous, "Long-Haul Truck Idling Burns Up Profits", U.S. Department of Energy—Energy, Efficiency & Renewable Energy, Vehicle Technologies Office, DOE/CHO-AC02-06CH11357-1503, Aug. 2015, 4 total pages.

Anonymous, "Total Comfort—Truck Aftermarket Products", website at http://www.dometictruck.com, 28 total pages.

PCT/US17/60741, International Search Report (PCT/ISA/220 and PCT/ISA/210) dated Jan. 26, 2018, enclosing Written Opinion of the International Searching Authority (PCT/ISA/237) (Seven (7) pages).

Kenworth "Kenworth T680 Sleeper Trucks to Offer Auto Start and Stop", Datasheet [online]. Oct. 17, 2015. URL: https://www.kenworth.com/news-release/2015/october/auto-start-and-stop/, 4 total pages.

\* cited by examiner

DRIVER BREAK PREPARATION SYSTEM FOR A HYBRID VEHICLE

FIELD OF THE INVENTION

The present invention relates to control of an electrical energy storage unit of a hybrid electric vehicle.

BACKGROUND OF THE INVENTION

Hybrid electric vehicles having an internal combustion engine combined with an electric motor-generator and an electrical energy storage system have been the focus of considerable attention in the automotive field. Hybrid electric vehicle systems are, however, only recently attracting significant interest for use in commercial vehicles, e.g., freight trucks.

For drivers of these commercial vehicles, federal, state and local laws, as well as private policies, regulate the length of driving shifts, as well as the frequency and duration of rest breaks between shifts. These policies are in place as safety measures to prevent driver fatigue.

It is for this reason that commercial motor vehicles are often equipped with sleeper berths, which are used by drivers during these rest breaks to sleep or otherwise rest. These sleeper berths are generally equipped with the conveniences of heating, air-conditioning, electric appliances, and other comforts. These and other hotel loads (i.e., non-propulsive electric loads) are typically powered by one or more of the following power sources: auxiliary power units, fuel fired heaters, on-vehicle electric storage systems ("ESS") and from a rest facility source. Auxiliary power units are typically combustion engine-driven electric generators and air-conditioning units that use power from a diesel engine to cool the sleeper berth and power the appliances. Fuel fired heaters burn diesel fuel to heat the sleeper berth. On-vehicle electric storage systems offer pre-charged sources of electric power that is typically charged by regenerative means, engine power or stationary power sources.

The application of hybrid electric vehicle systems to commercial vehicles provides the ability to use the hybrid electrical energy storage system to power vehicle electric loads.

U.S. Pat. No. 8,548,660 discloses a hybrid vehicle charging system that, during periods of driving, uses driver profile information, GPS information, environmental information, accessory information and system default parameters to generate a strategy for managing stored electric energy in order to power electric loads of the vehicle. But this prior art does not address predicting electrical power needs during rest breaks when the driver is not driving the vehicle. It also does not address ensuring sufficient electrical power is available at the beginning of the rest break in order to meet those predicted needs. Nor does this prior art take into account the need to ensure sufficient electrical power is present after a rest break to operate the vehicle.

If a hybrid vehicle's electrical energy storage system is to be used to power sleeper berth hotel loads during rest breaks, it is beneficial to ensure that—prior to the rest break—the amount of electrical energy stored is sufficient to power the hotel loads for the entire period of the rest break. It is also beneficial to ensure that the amount of electrical energy remaining after the rest break is sufficient to resume driving.

SUMMARY OF THE INVENTION

The present invention provides a control system that is uniquely suited to control the internal combustion engine and motor-generator of a hybrid electric vehicle so as to ensure that an electrical energy storage unit of a hybrid vehicle hybrid drive system is sufficiently charged to operate electric loads during periods of non-driving.

Exemplary hybrid drive systems are disclosed, for example, in co-pending U.S. patent application Ser. No. 15/378,853, entitled "Front End Motor-Generator System and Hybrid Electric Vehicle Operating Method," filed on Dec. 14, 2016, the entire contents and disclosure of which is herein incorporated by reference. The present invention is indeed particularly applicable in combination with such systems, which use the electric motor generator to charge the electrical energy storage unit through regenerative braking and during any negative torque event, so that the stored electric energy can then be directed to the electric motor-generator to power hotel loads.

The control system predicts forthcoming driving and non-driving conditions, and takes action to ensure that the electrical energy storage unit is sufficiently charged for an anticipated period of non-driving. In particular, the control unit is configured to control the hybrid drive system so as to actively charge the electrical energy storage unit in accordance with a determination that a predicted state of charge of the electrical energy storage unit at a start of the anticipated period of non-driving is less than a predicted energy consumption during the anticipated period of non-driving. The predicted energy consumption may also include the energy required to start the vehicle engine at the end of the period of non-driving. In addition or, or in place of active charging, the control unit may also be configured to control the hybrid drive system so as to ration power consumption ahead of the period of non-driving. The control unit may be embodied by appropriately configured hardware, software and/or firmware, such as, for example, a processor operating in accordance with computer program instructions stored in a data storage device.

As used herein, the term "actively charge," and its variations, refers to selectively utilizing the internal combustion engine to provide vehicle propulsion as well as drive the electric motor-generator to generate electrical energy that is then stored in the electrical energy storage unit. As used herein, the term "predicted energy consumption" refers to an amount of energy predicted to be consumed by the electrical loads powered by electrical energy from the electrical energy storage unit. The present invention thus ensures that the electrical energy storage unit contains sufficient electrical energy to power electrical loads (e.g., hotel loads and engine start) during periods of non-driving (e.g., rest breaks) by actively charging the electrical energy storage unit upon anticipating that the electrical energy storage unit in insufficiently charged for an upcoming period of non-driving.

Accordingly, a control unit is configured to execute a control process for actively charging the vehicle's electrical energy storage unit based on a determination of whether a predicted state of charge of the electrical energy storage unit at the start of an anticipated period of non-driving will be below required state of charge in view of a predicted energy consumption by hotel loads during the anticipated period of non-driving.

The control process may also include rationing the usage of electrical energy from the electrical energy storage unit in accordance with the determination that the predicted state of charge of the electrical energy storage unit at the start of an anticipated period of non-driving will be below the required state of charge in view of the predicted energy consumption by hotel loads during the anticipated period of non-driving. As used herein, the term "rationing" refers to implementing a control strategy for selectively operating one or more loads (and/or accessories) via the internal combustion engine only, so as to not use the electrical energy stored in the electrical energy storage unit.

The control process may also include determining a start time at which to start active charging and/or rationing—prior to the period of non-driving—in order to ensure that the predicted state of charge of the electrical energy storage unit at the start of the anticipated period of non-driving will not be below the required state of charge in view of the anticipated energy consumption during the anticipated period of non-driving, and to start active charging at the start time.

The determination may also include calculating the predicted state of charge based on one or more of: a current state of charge, a predicted power consumption until the period of non-driving, and an opportunity for regenerative braking prior to the period of non-driving. The determination may be based on one or more of: user input data, current condition data and historical data.

Other features and advantages of the present invention will become apparent from the following more detailed description, taken in conjunction with the accompanying drawings, which illustrate, by way of example, the principles of the presently described apparatus and method of its use.

DETAILED DESCRIPTION OF THE PREFERRED EMBODIMENTS

Figure 1:
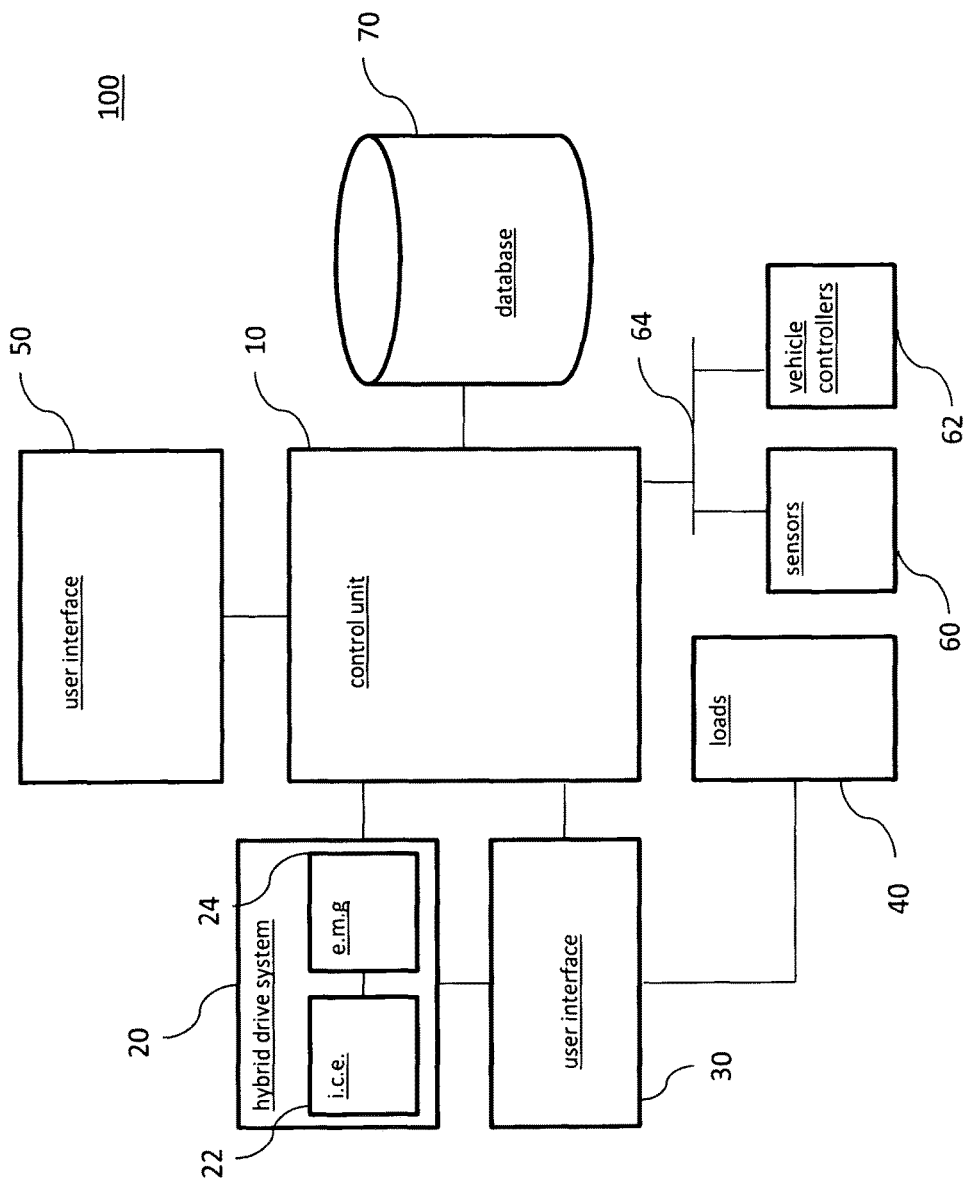
FIG. 1 is a block diagram that schematically illustrates a control system according to an embodiment of the present invention.

The above described drawing figures illustrate the invention in at least one of its preferred, best mode embodiment, which is further defined in detail in the following description. Those having ordinary skill in the art may be able to make alterations and modifications to what is described herein without departing from its spirit and scope. While the invention is susceptible of embodiment in many different forms, there is shown in the drawings and will herein be described in detail a preferred embodiment of the invention with the understanding that the present disclosure is to be considered as an exemplification of the principles of the invention and is not intended to limit the broad aspect of the invention to the embodiments illustrated. Therefore, it should be understood that what is illustrated is set forth only for the purposes of example and should not be taken as a limitation on the scope of the invention.

FIG. 1 is a block diagram that schematically illustrates a control system 100 according to at least one embodiment of the present invention. The control system 100 includes a control unit 10 operatively coupled to a hybrid drive system 20 of a hybrid electric vehicle.

The hybrid drive system 20 is configured to selectively utilize an internal combustion engine 22 of the hybrid electric vehicle to provide vehicle propulsion and/or to drive an electric motor-generator 24 of the hybrid electric vehicle to generate electrical energy to be stored in an electrical energy storage unit 30 for powering electrical loads 40. The control unit 10 may also communicate directly with the electrical energy storage unit 30, for example, over a vehicle network, to exchange energy storage-related information such as the current state of charge. The hybrid drive system 20 is also configured to selectively use the electrical energy stored in the electrical energy storage unit 30 to drive the electric motor-generator 24 to provide vehicle propulsion. The control unit 10 may receive information from a variety of sources, such as from one or more sensors 60 and from other vehicle controllers 62, preferably over a vehicle network such as a Control Area Network (CAN) 64.

Figure 2:
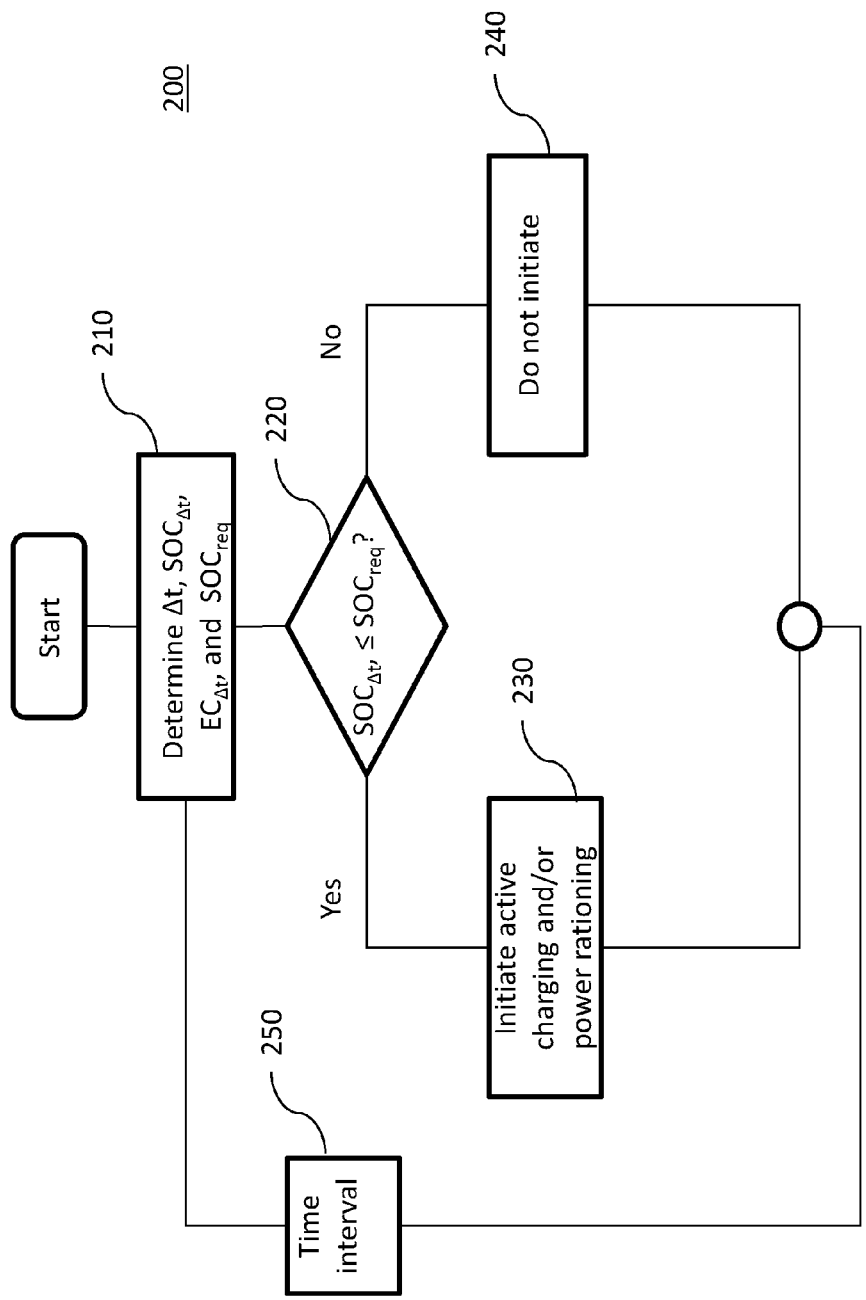
FIG. 2 is a flowchart that illustrates a control process according to an embodiment of the present invention.

FIG. 2 is an illustrative flowchart reflecting a simplified control process 200 for ensuring that the electrical energy storage unit 30 is sufficiently charged to operate electric loads 40 during periods of non-driving, in accordance with an embodiment of the present invention.

The control unit 10 predicts the period of non-driving $\Delta t$, and, in advance of the period of non-driving, predicts what the state of charge at the time of the period of non-driving $SOC_{\Delta t}$ will be, as well as a required $SOC_{req}$. The required state of charge is the state of charge needed to at least satisfy the predicted energy consumption $EC_{\Delta t}$ over the duration of the period of non-driving (Step 210).

This prediction may be as direct as reading preprogrammed, assumed or fixed values for one or more of these variables. For example, $\Delta t$ may be preprogrammed, assumed or fixed to be from 9:00 PM to 5:00 AM, $SOC_{req}$ may be preprogrammed, assumed or fixed to be the maximum state of charge for the electrical energy storage unit 30, and/or $SOC_{\Delta t}$ (i.e., the predicted state of charge) may be preprogrammed, assumed or fixed to be a minimum state of charge for the electrical energy storage unit 30.

This prediction may also be made by a calculation or other determination that considers a multitude of other variables, as described further herein. For example, $\Delta t$ may be calculated or determined to be from 9:00 PM to 5:00 AM, $SOC_{req}$ may be calculated or determined to be 85% of the maximum state of charge of the electrical energy storage unit 30, and/or $SOC_{\Delta t}$ (i.e., the predicted state of charge) may be calculated or determined to be 15% of the maximum state of charge of the electrical energy storage unit 30.

The control unit 10 then determines whether, based on these predictions, the predicted state of charge as of the start of the period of non-driving $SOC_{\Delta t}$ will be less than a required state of charge $SOC_{req}$ (Step 220). This determination may be made via a comparison of the predicted values of the two variables. It should be noted that the comparison can also be made between the predicted state of charge as of the start of the period of non-driving $SOC_{\Delta t}$ and the predicted energy consumption over the duration of the period of non-driving $EC_{\Delta t}$.

In the event the control unit 10 determines that the predicted state of charge as of period of non-driving $SOC_{\Delta t}$ will be less than the required state of charge $SOC_{req}$, the control unit 10 operates to actively charge the electrical energy storage unit 30 and/or to ration power consumption (Step 230). In the event the control unit 10 determines that the state of charge as of the period of non-driving $SOC_{\Delta t}$ will be equal to or greater than the required state of charge $SOC_{req}$, the control unit 10 operates in accordance with a default control strategy of the hybrid drive system 20 (Step 240).

In either case, after a predetermined time interval, the determination is made again (Step 250). Active charging and/or power rationing may continue until the control unit 10 determines that the predicted state of charge as of the period of non-driving $SOC_{\Delta t}$ will be equal to or greater than the required state of charge $SOC_{req}$. Active charging may further be re-activated whenever the control unit 10 determines that the state of charge as of the period of non-driving $SOC_{\Delta t}$ will be less than the required state of charge $SOC_{req}$. Periodic determinations by the control unit 10 are therefore expressly contemplated.

Figure 3:
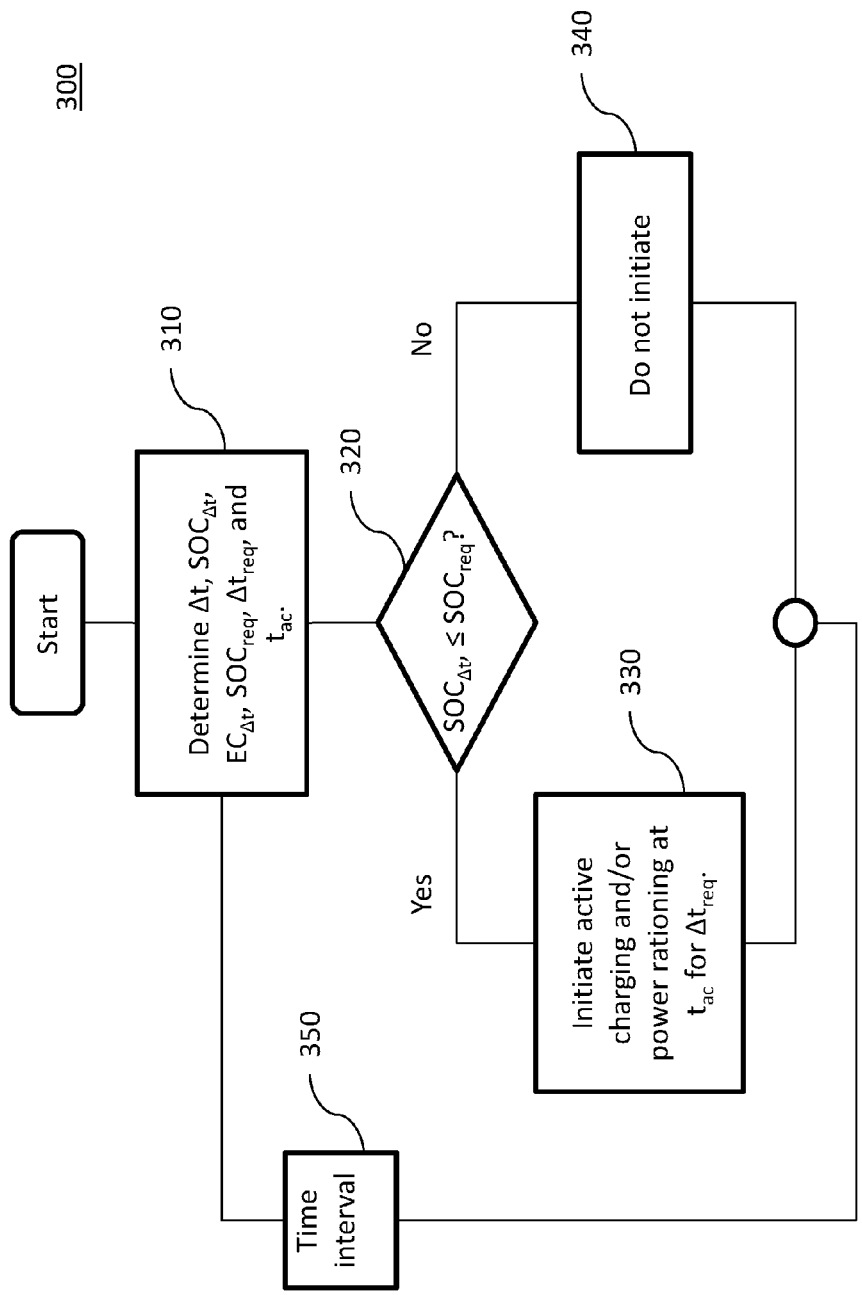
FIG. 3 is a flowchart that illustrates a control process according to an embodiment of the present invention.

FIG. 3 is an illustrative flowchart reflecting a modified control process 300 for ensuring that the electrical energy storage unit 30 is sufficiently charged to operate electric loads 40 during periods of non-driving, in accordance with at least one embodiment.

The control unit 10 is further configured to determine a length of time $\Delta t_{req}$ required to charge the electrical energy storage unit 30 and/or ration power such that the state of charge at the start of the period of non-driving $SOC_{\Delta t}$ will be equal to or greater than the required state of charge $SOC_{req}$ (Step 310). In the event the control unit 10 determines (Step 320) that the state of charge as of period of non-driving $SOC_{\Delta t}$ will be less than required state of charge $SOC_{req}$, the control unit 10 may operate to actively charge the electrical energy storage unit 30 and/or ration power consumption for the length of time required $\Delta t_{req}$ (Step 330).

The control unit 10 may also determine an active charging and/or power rationing start time $t_{ac}$ at which active charging and/or power rationing should begin in order to charge the electrical energy storage unit 30 and/or ration power over the entire length of time required $\Delta t_{req}$ prior to a start of the period of non-driving $\Delta t_{start}$ (Step 310). In other words, the control unit 10 may determine $t_{ac}$ such that $t_{ac} = \Delta t_{start} \Delta t_{req}$. The control unit 10 may operate to actively charge the electrical energy unit and/or ration power consumption starting at the start time $t_{ac}$ for the length of time required $\Delta t_{req}$ to charge the electrical energy storage unit 30 and/or ration power consumption such that $SOC_{\Delta t}$ will be equal to or greater than $SOC_{req}$ (Step 330).

In the event the control unit 10 determines that the state of charge as of the period of non-driving $SOC_{\Delta t}$ will be equal to or greater than the required state of charge $SOC_{req}$, the control unit 10 operates in accordance with an original control strategy of the hybrid drive system 20 (Step 340). After a predetermined time interval, the determination is made again (Step 350).

As described herein, the control unit 10 may be configured to control the hybrid drive system 20 to ration the consumption of the stored electrical energy by the one or more electric loads 40 so that the predicted state of charge as of the period of non-driving $SOC_{\Delta t}$ will be equal to or greater than the required state of charge $SOC_{req}$. Accordingly, in at least one embodiment, the control unit 10 may be configured to instruct the hybrid drive system 20 to limit usage of electric charge from the electric energy storage unit 30 to power one or more of the electric loads 40. Electric loads 40 whose power consumption is rationed may include, for example, the propulsion providing aspect of the motor-generator 24, air-conditioning systems, engine fan belts, and other known electric loads 40. This state of rationing stored electric energy may continue for any period of time in advance of the period of no-driving in order to ensure sufficient charge during the period of non-driving. For example, rationing may occur at the same time as active charging, or it may occur after active charging is complete. Rationing may last until the period of non-driving starts, or for any other period prior to the period of non-driving.

Returning to FIG. 1, the control system 100 may further comprise a user interface 50, one or more sensors 60 and a database 70, all operatively coupled to the control unit 10, which controls each to operate in accordance with its described functionality.

The user interface is configured to receive driver input data and to communicate the driver input data to the control unit 10 for use thereby and/or the database for storage therein. The user interface may include one or more of: a visual display, such as a monitor; an audio input/output device, such as a microphone and/or audio speaker; a tactile input/output device, such as a keypad or touchscreen; and a transceiver for receiving the driver input data from a remote source. In at least one embodiment, the user interface includes a mobile software application or "app" executed by a mobile device that is physically separate from the hybrid electric vehicle.

The driver input data preferably includes one or more of: driver identity and/or profile information; destination information indicating an intended destination; route information indicating an anticipated route for reaching the intended destination; a maximum driving time before the period of non-driving is required by law or policy; an anticipated period of non-driving $\Delta t$, including a start, an end and/or a duration of the anticipated period of non-driving; an anticipated location at which the period of non-driving is anticipated to occur; and any other data whose input into the control system 100 would assist in the determinations and/or predictions made by the control unit 10, as described herein.

Each of the one or more sensors 60 is configured to sense a current condition, to generate current condition data therefrom, and to communicate the current condition data to the control unit 10 for use thereby and/or the database for storage therein. The sensors 60 may include one or more of: electrical energy storage management system sensors that sense the current state of charge of the electrical energy storage unit 30, the allowable charging power, and the current power consumption by the electric loads; temperature sensors, e.g., thermocouples, that sense the ambient temperature and/or the temperature of one or more vehicle sub-systems; location, terrain and traffic sensors, e.g., GPS or other navigation systems, that determine the location of the vehicle, current traffic conditions at or near the current location and/or along the route, and the current terrain on which the vehicle is travelling; an internal clock that senses the current time; and any other sensor that generates data whose input the control system 100 would assist in the determinations and/or predictions made by the control unit 10, as described herein.

The database is configured to receive the driver input data and the current condition data, and to store such data as historical data. The database is further configured to communicate the historical data to the control unit 10 for use by the control unit 10 in the determinations and/or predictions made by the control unit 10, as described herein. The database may be an on-board database comprising one or more non-volatile memory devices, or it may an off-board database located at a central server communicatively coupled to the control unit 10 via a wireless connection.

The control unit 10 is configured to calculate and store within the database one or more power consumption averages that indicate the average power consumption and/or consumption rates of the one or more electric loads 40. For example, the control unit 10 may calculate and store the average power consumption for the air-conditioning system, the heating system, the on-board appliances, and other accessories, as well as the historical ambient temperatures.

The control unit 10 may further be configured to calculate these average power consumption and/or consumption rates of the one or more electric loads 40 under similar circumstances, as indicated by the driver input and condition data. For example, the control unit 10 may be configured to calculate the historical average power consumption of: the electric loads 40 along the same (or a similar) route from the current vehicle location to the location at which the period of non-driving is anticipated to occur, at a similar time and under similar traffic, terrain, and weather conditions; and/or of hotel loads during past periods of non-driving under similar non-driving conditions. In at least one embodiment, the control unit 10 calculates these averages over a predetermined period.

As described herein, the control unit 10 is configured to determine the anticipated period of non-driving $\Delta t$, the predicted state of charge as of the period of non-driving $SOC_{\Delta t}$, and required state of charge $SOC_{req}$. In accordance with at least one embodiment, these determinations are preferably based on one or more of: the driver input data, the current condition data, and the historical data stored in the database.

The user interface device may also be configured to communicate to the driver any information related to the functionalities described herein, including any of the driver input data, communication data and/or historical data, as well as the determinations of the control unit 10. The driver is accordingly able to make informed decisions regarding the period of non-driving.

Figure 4:
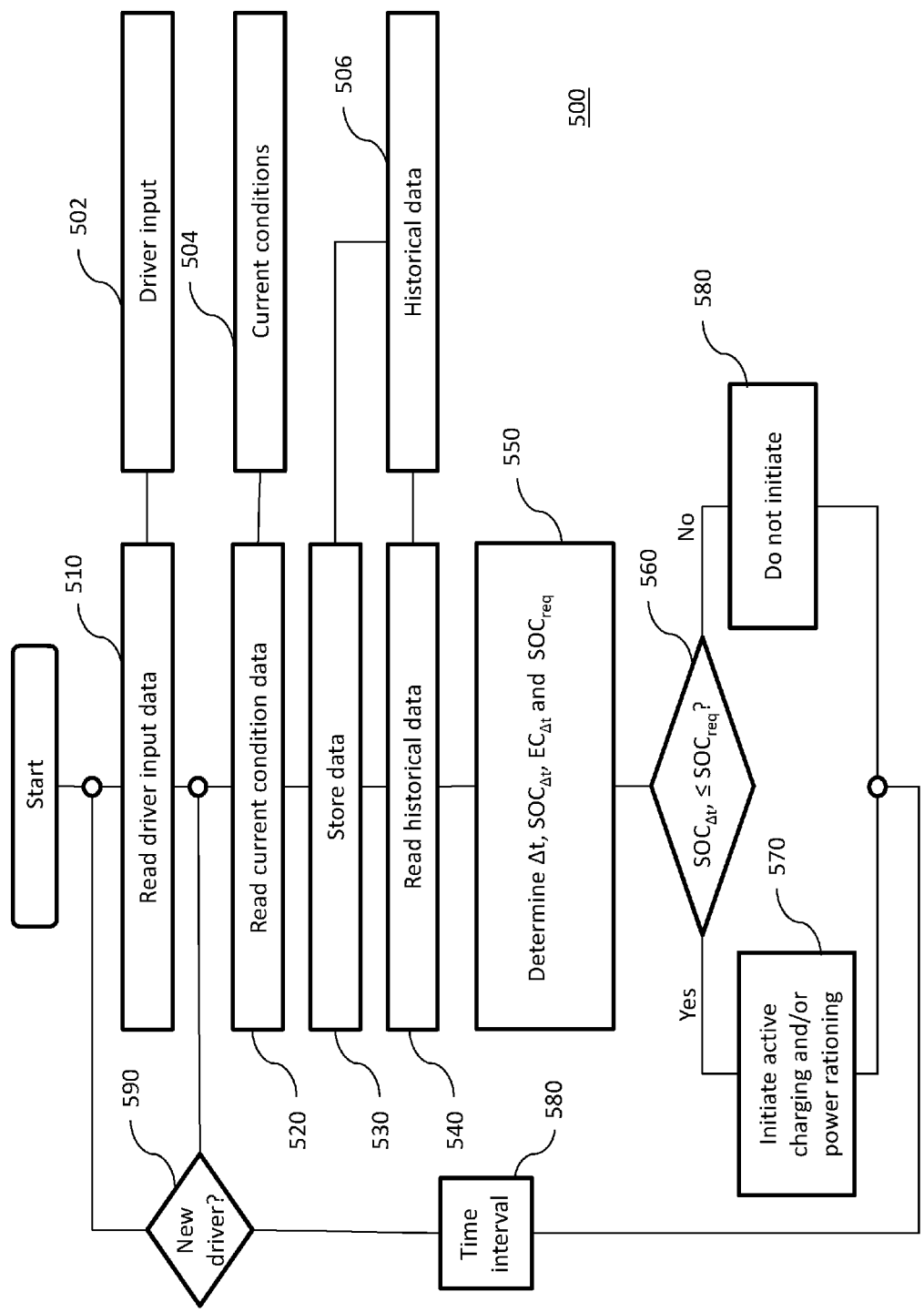
FIG. 4 is a flowchart that illustrates a control process according to an embodiment of the present invention.

FIG. 4 is an illustrative flowchart reflecting a control process 500 that uses the driver input data, the current condition data, and the historical data to ensure that the electrical energy storage unit 30 is sufficiently charged to operate electric loads 40 during periods of non-driving, in accordance with at least one embodiment Driver input data 502 is entered via the user interface, and is read into the control system 100 by the control unit 10 (Step 510). Current condition data is provided via the one or more sensors 60, and is also read into the control system 100 by the control unit 10 (Step 520). Current condition data may include, for example, ambient air temperature, current state of charge, terrain, traffic, current power consumption, or any other sensed or gathered data reflecting current conditions relevant to the determinations discussed herein. The control unit 10 retrievably stores the driver input data and the current condition data in the database as historical data 506 (Step 530).

The control unit 10 reads the historical data, including the driver input data and the current condition data (Step 540) and, based thereon, predicts the period of non-driving $\Delta t$, and, in advance of the period of non-driving, predicts what the state of charge at the time of the period of non-driving $SOC_{\Delta t}$ will be, as well as a required $SOC_{req}$ state of charge (Step 550), in accordance with the principles of the invention described herein.

In determining the anticipated period of non-driving, the control unit 10 may determine, based on the driver input data, the current condition data and/or the historical data, the time already driven out of the maximum driving time, the anticipated time along the route until reaching the intended destination, the anticipated time along the route until reaching a suitable location at which to stop for the period of non-driving, as well as likely effects of traffic, weather, fuel and other ambient conditions may have on the start time and duration of the period of non-driving. It should be noted that the determination may be that there is no period of non-driving because, for example, the intended destination is intended to be reached before the period of non-driving is required (i.e., before the maximum drive time is reached).

This anticipated period for non-driving may be displayed or otherwise communicated to the driver via the user interface device. The user interface device may also communicate when a full state of charge has been reached, allowing the driver to make an informed decision regarding preparation for the period of non-driving.

For example, the driver may have driven 7 hours of a 10 hour maximum driving time by 4:00 PM, which would typically require the driver to stop for the period of non-driving at 7:00 PM until 2:00 AM. The control unit 10, however, may determine that the suitable location (e.g., Boulder, Colo.) corresponding to a time closest to the typical 7:00 PM period of non-driving, without exceeding it, is predicted to be reached at 6:45 PM along the route. The control unit 10 accordingly determines that the period of non-driving begins 6:45 PM, and the user is informed via the user-interface device.

In determining the required state of charge $SOC_{req}$, the control unit 10 predicts the energy consumption by the hotel loads over the duration of the period of non-driving $EC_{\Delta t}$, and determines the required state of charge $SOC_{req}$ based on the predicted energy consumption $EC_{\Delta t}$. The required state of charge $SOC_{req}$ may be a predetermined or calculated amount more than is necessary to meet the predicted energy consumption $EC_{\Delta t}$. It may, for example, be a state of charge necessary to both meet the predicted energy consumption as well as allow for driving after the period of non-driving.

In determining the predicted energy consumption $EC_{\Delta t}$, the control unit 10 preferably determines, based on the driver input data, the current condition data and/or the historical data, the historical energy consumption during past periods of non-driving with conditions similar to those anticipated for the upcoming period of non-driving for which the determination is being made. This historical energy consumption may be driver specific, or driver non-specific.

Continuing with the previous example, the control unit 10 may determine that the predicted temperature in Boulder, Colo. during the 6:45 PM to 2:00 AM time period is 36° F., and that the driver, under similar conditions in the past, used 7 kWh to power the sleeper berth heater.

In determining the predicted state of charge as of the start of the period of non-driving $SOC_{\Delta t}$, the control unit 10 preferably determines, based on the driver input data, the condition data and/or the historical data, the current state of charge of the electrical energy storage unit 30, the predicted power consumption by electrical loads 40 for the upcoming route prior to the anticipated period of non-driving, and the opportunity for regenerative braking or other charging events that are not active charging events. The predicted state of charge can alternatively be a preprogrammed or assumed value, e.g., the minimum state of charge.

The current state of charge is preferably determined by directly reading the condition data of the electrical energy storage management system sensors.

The predicted power consumption for the upcoming route prior to the period of non-driving is preferably determined based on one or more of: current power consumption, route, and historical data. The predicted power consumption may be based on predicting that the current power consumption will continue as-is or that it will change as a function of time prior to the anticipated period of non-driving. For example, the control unit 10 may predict that, due to a temperature drop 1 hour further down the route, a particular driver is likely to power the heater to draw an additional 2 kWh of power before the period of non-driving, resulting in a predicted power consumption of 5 kWh of power consumption prior to the period of non-driving.

The opportunities for regenerative braking or other charging events along the upcoming route are preferably determined based on geography and traffic conditions. For example, the control unit 10 may predict that, due to an upcoming downhill portion of the route along which there is little traffic, there is an opportunity to generate and store 1 kWh of electric energy via regenerative braking.

Keeping with FIG. 4, the control unit 10 then determines whether, based on these predictions, the state of charge as of the period of non-driving $SOC_{\Delta t}$ will be less than the required state of charge $SOC_{req}$ (Step 560). This determination may be made via a comparison of the predicted values of the two variables.

In the event the control unit 10 determines that the predicted state of charge as of period of non-driving $SOC_{\Delta t}$ will be less than the required state of charge $SOC_{req}$, the control unit 10 operates to actively charge the electrical energy storage unit 30 and/or to ration power to the electric loads 40 (Step 570). In the event the control unit 10 determines that the predicted state of charge as of the period of non-driving $SOC_{\Delta t}$ will be equal to or greater than the required state of charge $SOC_{req}$, the control unit 10 operates in accordance with the default control strategy of the hybrid drive system 20 (Step 580).

After a predetermined time interval 580, the control unit 10 determines whether new driver input data has been entered (Step 590). This may include, for example, a route change, a driver change, and/or any other driver input data that may alter the determinations made by the control unit 10. If new driver input data has been entered, the control unit 10 reads the new driver input data into the control system 100 (Step 510). Updated current conditions are read into the control system 100 (Step 520), and the determinations are updated in accordance with the updated current conditions and the new driver input data (Step 550).

If new driver input data has not been entered, updated current conditions are nevertheless read into the control system 100 (Step 520), and the determinations are again made in accordance with the updated current conditions and the previously entered driver input data (Step 550).

Active charging and/or power rationing may continue until the control unit 10 determines that the predicted state of charge as of the period of non-driving $SOC_{\Delta t}$ will be equal to or greater than the required state of charge $SOC_{req}$. Active charging and/or power rationing may be re-activated whenever the control unit 10 determines that the predicted state of charge as of the period of non-driving $SOC_{\Delta t}$ will be less than the required state of charge $SOC_{req}$.

It will be appreciated that the control unit 10 may further be configured to determine one or more of: the length of time $\Delta t_{req}$ required to charge the electrical energy storage unit 30 and/or ration power, and the active charging start time $t_{ac}$, and to operate in accordance with those determinations, as described herein with respect to at least FIG. 3.

In this manner, the control system 100 according to at least one embodiment ensures that the electrical energy storage unit 30 is sufficiently charged to operate electric loads 40 during periods of non-driving. It will be understood that the determinations made by the control system 100 are preferably made during a driving period, prior to the anticipated period of non-driving. Thus, a principle of the present invention is the time-based determination of whether the electric energy storage unit 30 will be sufficiently charged at a future time (i.e., the start of period of non-driving) to power hotel loads for a duration during which there will be no active charging (i.e., the length of the period of non-driving), as well as the time-based control strategy of initiating active charging and/or power rationing at a point in time that is determined to ensure the electric energy storage unit 30 will be sufficiently charged prior to the future start of the period of non-driving.

The enablements described in detail above are considered novel over the prior art of record and are considered critical to the operation of at least one aspect of the invention and to the achievement of the above described objectives. The words used in this specification to describe the present embodiments are to be understood not only in the sense of their commonly defined meanings, but to include by special definition in this specification: structure, material or acts beyond the scope of the commonly defined meanings. Thus if an element can be understood in the context of this specification as including more than one meaning, then its use must be understood as being generic to all possible meanings supported by the specification and by the word or words describing the element.

The definitions of the words or drawing elements described herein are meant to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements described and its various embodiments or that a single element may be substituted for two or more elements in a claim.

The functionalities described herein may further be implemented via hardware, software, firmware or any combination thereof, unless expressly indicated otherwise. If implemented in software, the functionalities may be stored as one or more instructions on a computer readable medium, including any available media accessible by a computer that can be used to store desired program code in the form of instructions, data structures or the like. Thus, certain aspects may comprise a computer program product for performing the operations presented herein, such computer program product comprising a computer readable medium having instructions stored thereon, the instructions being executable by one or more processors to perform the operations described herein. It will be appreciated that software or instructions may also be transmitted over a transmission medium as is known in the art. Modules and/or other appropriate means for performing the operations described herein may be utilized in implementing the functionalities described herein.

Changes from the claimed subject matter as viewed by a person with ordinary skill in the art, now known or later devised, are expressly contemplated as being equivalents within the scope intended and its various embodiments. Therefore, obvious substitutions now or later known to one with ordinary skill in the art are defined to be within the scope of the defined elements. This disclosure is thus meant to be understood to include what is specifically illustrated and described above, what is conceptually equivalent, what can be obviously substituted, and also what incorporates the essential ideas.

The foregoing disclosure has been set forth merely to illustrate the invention and is not intended to be limiting. Because such modifications of the disclosed embodiments incorporating the spirit and substance of the invention may occur to persons skilled in the art, the invention should be construed to include everything within the scope of the appended claims and equivalents thereof.

LISTING OF REFERENCE LABELS

10 Control unit
20 Hybrid drive system
22 Internal combustion engine
24 Electric motor-generator
30 Electrical energy storage unit
40 Electric loads
50 User interface
60 Sensors
62 Vehicle controllers
64 Control Area Network (CAN)
70 Database
$\Delta t$ Period of non-driving from start to end
$SOC_{\Delta t}$ Predicted state of charge at the time of $\Delta t$
$EC_{\Delta t}$ Predicted energy consumption over the duration of $\Delta t$
$SOC_{req}$ State of charge required to at least satisfy $EC_{\Delta t}$
$\Delta t_{req}$ Length of time required to charge and/or ration
$t_{ac}$ Start time for charging or rationing

What is claimed is:

1. A control system for use in a commercial hybrid electric vehicle having an internal combustion engine combined with a motor-generator and an electrical energy storage unit, the control system comprising:
a control unit configured to control the internal combustion engine and the motor-generator to actively charge the electrical energy storage unit in accordance with a determination that a predicted state of charge of the electrical energy storage unit during an anticipated period of non-driving will be below an anticipated energy consumption by hotel loads during the anticipated period of non-driving.

2. The control system of claim 1, further comprising:
a user interface configured to receive user input data,
wherein the determination of the control unit is based on the user input data.

3. The control system of claim 1, further comprising:
a user interface configured to receive user input data;
one or more sensors configured to generate current condition data;
a database configured to receive and store the user input data and the current condition data as historical data,
wherein the determination of the control unit is based on one or more of: the user input data, the current condition data and the historical data.

4. The control system of claim 1, wherein the control unit is further configured to determine a start time at which to start active charging to ensure that the predicted state of charge of the electrical energy storage unit during the anticipated period of non-driving will not be below the anticipated energy consumption during the anticipated period of non-driving, and to start active charging at the start time.

5. The control system of claim 1, wherein the control unit is further configured to ration usage of electrical energy from the electrical energy storage unit in accordance with the determination by the control unit.

6. The control system of claim 1, wherein the control unit is further configured to calculate the predicted state of charge based on one or more of: a current state of charge, a predicted power consumption until the period of non-driving, and an opportunity for regenerative braking prior to the period of non-driving, as determined based on one or more of: the user input data, the current condition data and the historical data.

7. The control system of claim 1, wherein the hotel loads consist of sleeper berth loads powered by the electrical energy storage unit during periods of non-driving.

8. The control system of claim 1, wherein the determination made by the control unit is periodic.

9. The control system of claim 1, wherein the anticipated energy consumption by hotel loads during the anticipated period of non-driving includes energy required to restart the internal combustion engine when the period of non-driving concludes.

10. A control process for use in a commercial hybrid electric vehicle having an internal combustion engine combined with a motor-generator and an electrical energy storage unit, the control process comprising:
determining that a predicted state of charge of the electrical energy storage unit during an anticipated period of non-driving will be below an anticipated energy consumption by hotel loads during the anticipated period of non-driving; and
causing the internal combustion engine and the motor-generator to actively charge the electrical energy storage unit in accordance with the determination.

11. The control process of claim 10, further comprising:
receiving user input data via a user interface,
wherein the determination is based on the user input data.

12. The control process of claim 10, further comprising:
receiving user input data via a user interface;
generate current condition data via one or more sensors;
storing the user input data and the current condition data in a database as historical data,
wherein the determination is based on one or more of: the user input data, the current condition data and the historical data.

13. The control process of claim 10, further comprising:
determining a start time at which to start active charging to ensure that the predicted state of charge of the electrical energy storage unit during the anticipated period of non-driving will not be below the anticipated energy consumption during the anticipated period of non-driving; and
start active charging at the start time.

14. The control process of claim 10, further comprising:
rationing usage of electrical energy from the electrical energy storage unit in accordance with the determination.

15. The control process of claim 10, further comprising:
calculating the predicted state of charge based on one or more of: a current state of charge, a predicted power consumption until the period of non-driving, and an opportunity for regenerative braking prior to the period of non-driving, as determined based on one or more of: the user input data, the current condition data and the historical data.

16. The control process of claim 10, wherein the hotel loads consist of sleeper berth loads powered by the electrical energy storage unit during periods of non-driving.

17. The control process of claim 10, wherein the determination is periodic.

18. The control process of claim 10, wherein the anticipated energy consumption during the anticipated period of non-driving includes energy required to restart the internal combustion engine when the period of non-driving concludes.

* * * * *